Sept. 6, 1955  R. R. CHAPPELL  2,717,192
RECORDING APPARATUS
Filed June 14, 1949  3 Sheets-Sheet 1

Inventor:
Ralph R. Chappell
By 
his Attorney

Sept. 6, 1955  R. R. CHAPPELL  2,717,192
RECORDING APPARATUS
Filed June 14, 1949  3 Sheets-Sheet 2
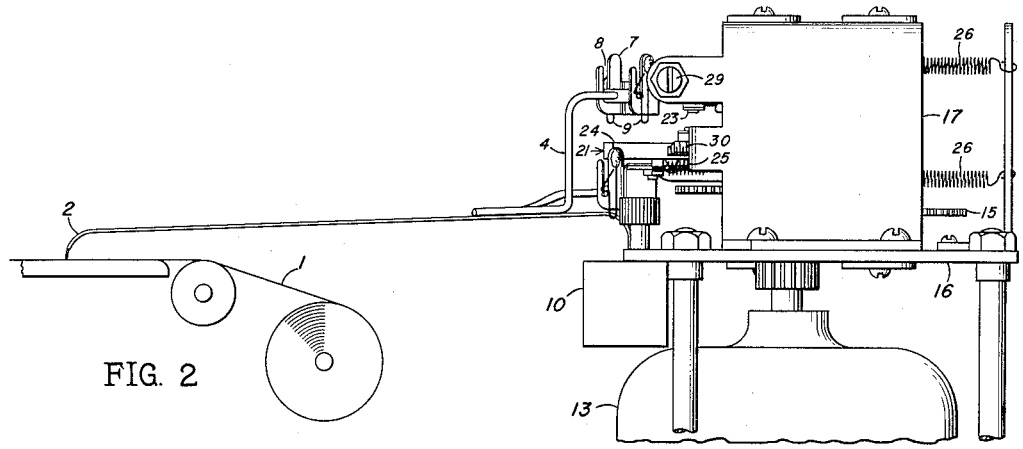
FIG. 2
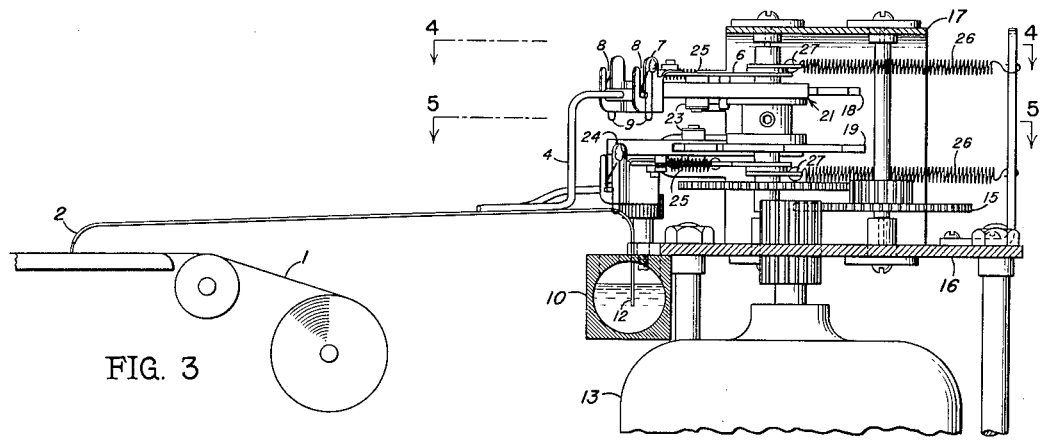
FIG. 3
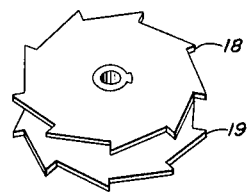
FIG. 10
Inventor:
Ralph R. Chappell
his Attorney Sept. 6, 1955 R. R. CHAPPELL 2,717,192
RECORDING APPARATUS
Filed June 14, 1949 3 Sheets-Sheet 3
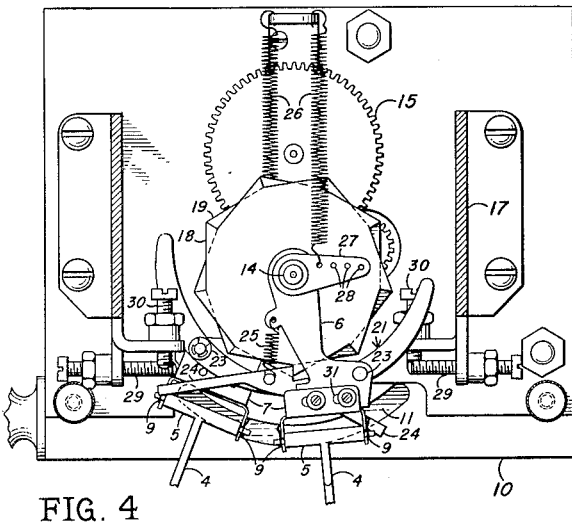
FIG. 4
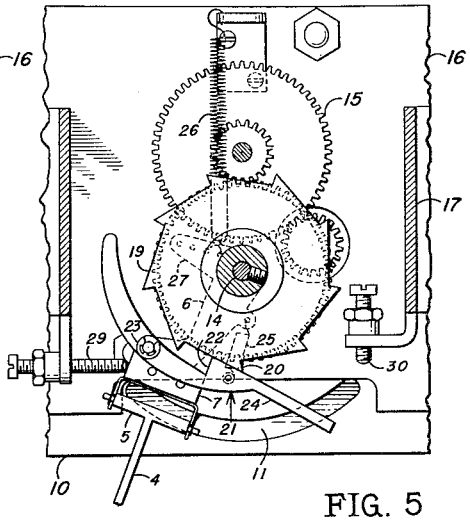
FIG. 5
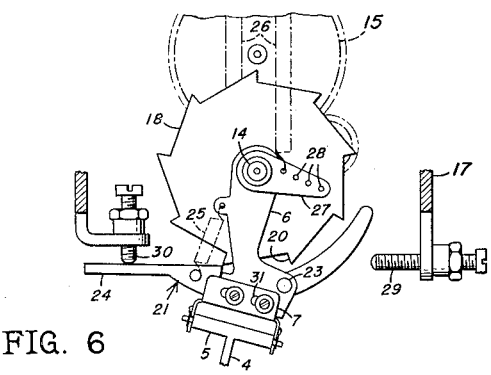
FIG. 6
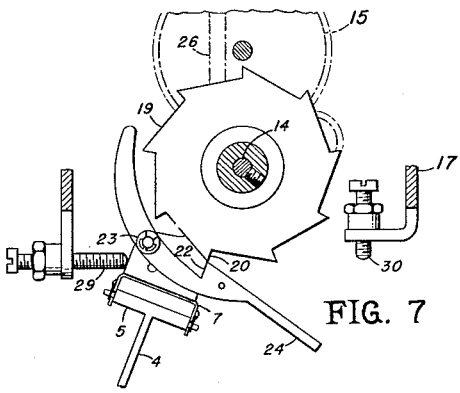
FIG. 7
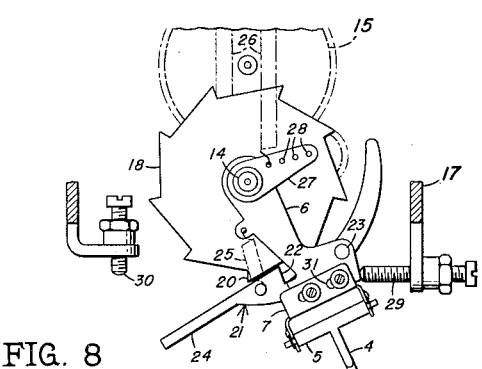
FIG. 8
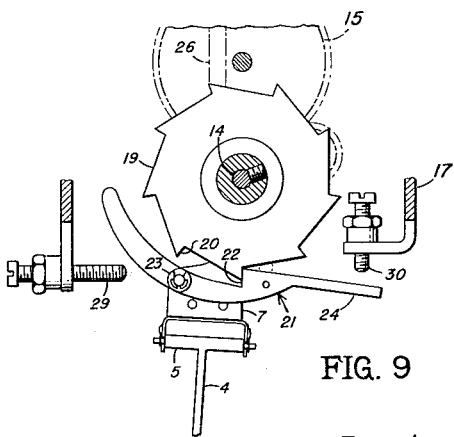
FIG. 9
Inventor:
Ralph R. Chappell
his Attorney United States Patent Office 2,717,192
Patented Sept. 6, 1955

2,717,192

RECORDING APPARATUS

Ralph R. Chappell, Belfort, Md.

Application June 14, 1949, Serial No. 98,912

15 Claims. (Cl. 346—139)

This invention relates to recording apparatus for making records of variable functions.

The use of recording apparatus in recording data on variable functions, as an efficient means of obtaining an automatic record for comparison and other purposes, is wide-spread. Thus, recorders are now used in many fields, in some, for recording linear functions such as liquid level and in others, circular functions such as wind or compass direction. Usually operated mechanically, electrically or by combination of these forces, such apparatus faithfully records the function for which it is designed without the element of human error. However, interpretation of the records or charts so made, has, in many cases, been exceedingly difficult, reintroducing the element of human error which the mechanism itself has eliminated. As an illustration, the recording of wind direction, a circular function, on a strip chart was early attempted by an apparatus employing a single pen driven by a heart-shaped cam. This pen was adapted to traverse a chart covering, from margin to margin, 180°, the pen being driven across the chart in one direction by one lobe of the heart and returned in the opposite direction by the other lobe. As no distinction was made between a complete revolution of the cam and a half revolution followed by reversal of direction, it was impossible to read directly from the chart the direction of shift of the wind. Ultimately, direct reading was made possible by the use of two cams, each driving a pen, the latter recording on a chart 360° wide. In this type, known as the James' Improvement of the Dines Recorder, each of the pens was responsive to shift of the wind in one direction and was enabled to fly off the chart and return to starting position at the end of a traverse, from thence to recommence recording a further shift in the same direction. Consequently, there was obtained with this recorder a distinct record not only of extent but direction of shift of wind. However, this and all other recorders of the cam type possess in common the disadvantage of requiring extremely accurately machined cams with consequent expensiveness.

The primary object of the present invention is to provide improved recording apparatus for making unambiguous recordings of variable functions.

Another object of the invention is to provide recording apparatus for making unambiguous continuous records of variable functions through the use of ratchet drives.

Another object of the invention is to provide ratchet driven recording mechanism for continuously recording circular, linear or other functions on a strip chart wherein the recording members are driven by relatively inexpensive but extremely accurate ratchet drives.

A further object of the invention is to provide a ratchet driven recording apparatus in which the forces opposing the torque imparted by the function being recorded to the cam-driving shaft are relatively small, rendering the apparatus extremely sensitive and accurate.

An additional object of the invention is to provide improved recording apparatus of relatively simple and rugged construction which may be produced at a cost far below recorders of comparable accuracy.

Other objects and advantages of the invention will appear hereinafter in the detailed description, be particularly pointed out in the appended claims and illustrated in the accompanying drawings in which:

Figure 2 is a fragmentary side elevational view of the apparatus and chart of Figure 1;

Figure 3 is a fragmentary vertical sectional view, taken along the lines 3—3 of Figure 1;

Figure 4 is a horizontal sectional view, taken along the lines 4—4 of Figure 3;

Figure 5 is a fragmentary horizontal sectional view, taken along the lines 5—5 of Figure 3, showing the lower ratchet and associated structure in the same position as in Figure 4;

Figure 6 is a fragmentary horizontal sectional view of the upper ratchet and associated structure of Figure 4, showing the pawl at the point of disengagement at the end of a full cycle of clockwise movement;

Figure 7 is a fragmentary horizontal sectional view of the lower ratchet and associated structure of Figure 5 in positions corresponding to those of the upper ratchet and associated structure in Figure 6;

Figure 8 is a fragmentary horizontal sectional view of the upper ratchet and associated structure of Figure 4, showing the positions assumed after a partial cycle of counterclockwise movement;

Figure 9 is a fragmentary horizontal sectional view of the lower ratchet and associated structure of Figure 5 in positions corresponding to those of the upper ratchet and associated structure of Figure 8; and Figure 10 is a perspective view of the ratchet drive, showing the drive removed from the apparatus.

Figure 1:
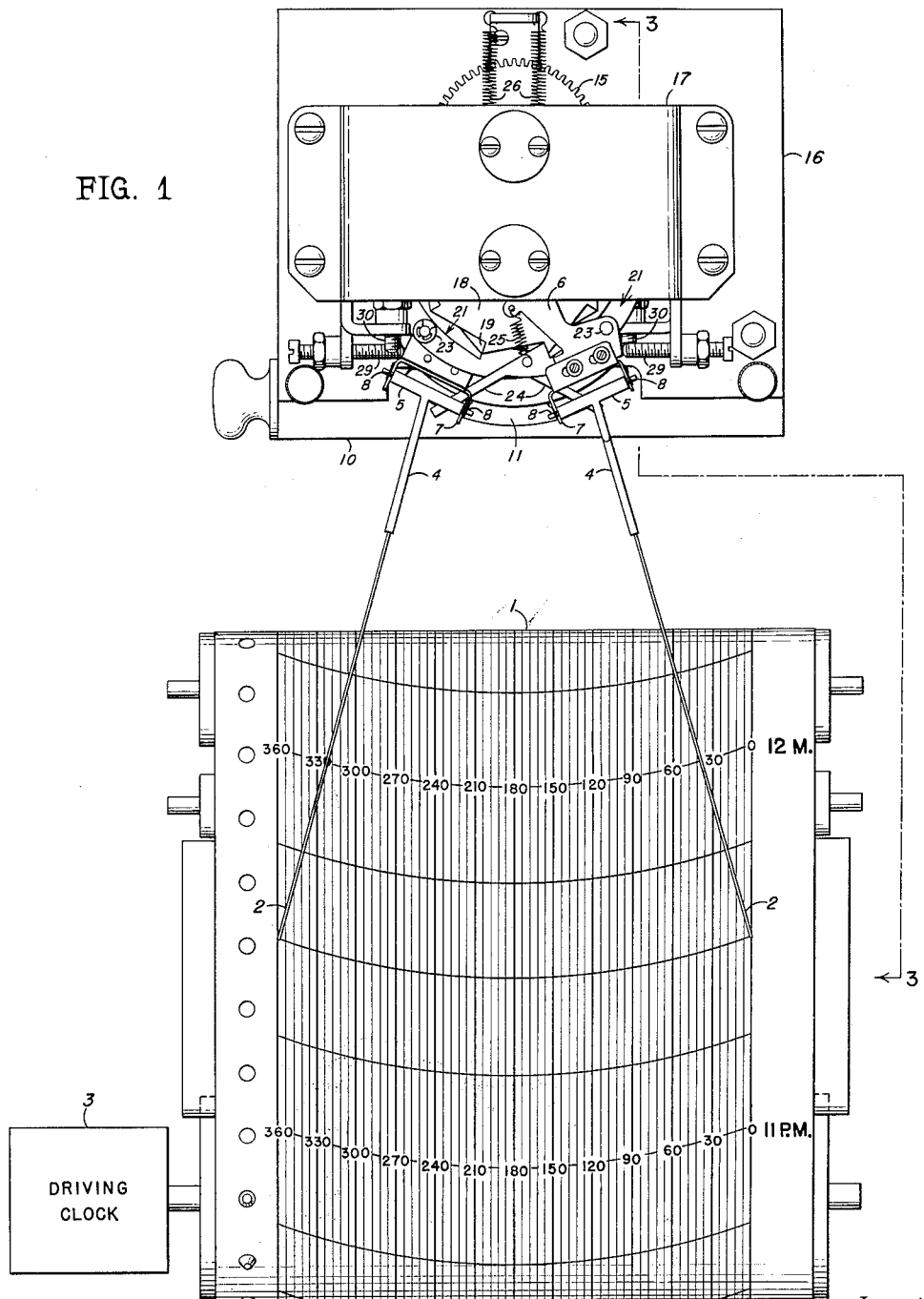
Figure 1 is a plan view of a preferred embodiment of the invention with the recording members positioned to record on a continuous strip chart.
Figure 1:

Referring now in detail to the drawings in which like reference characters designate like parts, the improved recording apparatus of the present invention has been illustratively applied to the transfer of variable functions to rectangular coordinates by automatically recording these functions as graphs on a continuous strip chart. The apparatus may be employed for recording variable functions from circular to linear, the latter, for the illustrated embodiment, involving merely preconversion of the linear functions to circular movement by any of the well-known methods.

For illustrative purposes it has been assumed that the apparatus is employed for the recording of the values of circular functions at given moments, the recording chart thus being calibrated in degrees versus time.

Considering now the structure of the illustrated embodiment of the recording apparatus, its record is made on a chart 1, which may be of the continuous strip type, the recording members being a pair of pens or styli 2. As previously mentioned, the illustrated chart on which the record is made is designed for recording circular functions, such as wind or compass direction, against time, on rectangular coordinates, and for this purpose is calibrated laterally in degrees. As in the case of the aforementioned James Recorder, the width of the chart from margin to margin represents a complete revolution or shift of 360°. For continuous records, the chart may be in roll form and driven by suitable driving means, such as the indicated driving clock 3.

For mounting the pens 2, each may be provided with an offset arm 4 having a cross-head 5 at its upper end which is adapted to be received in a carrier or carriage 6, the latter being associated with the other elements of the apparatus in the manner to be hereinafter described. To facilitate attachment or removal of the pens, their carriages may be provided with a mounting hanger or bracket 7 of the resilient clip type, wherein the ends of the cross-heads 5 are received in spaced slots 8 and releasably held therein by displaceable springs or like means 9. The pens themselves are preferably of the hollow-stemmed gravity-feed type and are supplied with ink from a reservoir or well 10 suitably mounted on the apparatus. As shown, the reservoir is elongated and provided with an arcuate slot 11 in its upper wall through which the pen tips 12 project or depend into the ink supply.

While utilizing a pair of pens and recording on a 360° chart, in the manner of the James Recorder, the pen-driving mechanism is markedly different from the cam drives of prior recorders. Referring to Figures 2 and 3, the variable functions to be recorded are transmitted to the recording apparatus through suitable driving means, such as the fragmentarily illustrated self-synchronous motor 13, the latter in turn being connected to a main or control shaft 14, through reduction gearing 15. For simplicity, both the shaft and the reduction gearing are shown carried on a base plate 16 surmounted by an open-ended inverted U-shaped casing 17, between which the gearing and the shaft are suitably journaled.

For transmitting the movement of the control shaft to the pens 2, there are mounted on the shaft in superposed or vertically spaced relation a pair of ratchets or ratchet wheels, the upper ratchet being numbered 18 and the lower 19. These ratchets are intended to rotate with the shaft and for this purpose are mounted thereon, or fitted thereto as by swedging or keying. As shown in Figures 4 through 9, the ratchets 18 and 19 are geometrically identical but oppositely facing, the upper being adapted to drive when rotating clockwise and the lower when rotating counterclockwise. Each ratchet is provided with the same number of driving teeth 20, spaced equally about their peripheries. Each of these teeth is designed to drive a pen fully across the chart 1. Since the latter distance represents a full revolution of the motor 13, the number of teeth will, of course, vary with the extent of the arc which the pen point must describe. For the extent of chart and pen length illustrated, in which the angle included by the arc is two-ninths (2/9) pi radians, nine (9) teeth are employed, each covering one-ninth (1/9) of a full revolution of the driving motor 13, with the ratio of the reduction gearing correspondingly 9:1.

With each of the ratchets 18 and 19 is associated the carriage 6 of one of the pens 2. These carriages are also mounted on the shaft 14 but unlike the ratchets are rotatable or pivotal relative thereto. For drivably connecting the carriages to their associated ratchets, there is pivotally attached to each of the carriages, outwardly of the peripheries of the ratchets, a pawl or dog 21 having a tooth 22 adapted to engage any one of the teeth 20 of the associated ratchet. As shown, the portion of the pawl adjacent its pivot is of crescent or other suitable shape to clear the ratchet. For reasons to be hereinafter pointed out, the pivot 23 of each pawl is removed as far as practicable from its pawl tooth, and the pawl is provided with an elongated striking arm 24 projecting beyond the tooth, away from its pivot. Contact between each of the pawls and its associated ratchet is maintained by suitable resilient or yieldable means, such as the illustrated coil tension or reaction spring 25. Additionally, each of the carriages is normally urged in a direction opposite the driving direction of its associated ratchet by a return spring 26 anchored at one end to the base plate 16 and connected at its other end to the carriage through a separate or integral leg 27, affixed to the carriage and disposed substantially normal to the main axis or leg of the latter. To permit adjustment of tension, the leverage of each of the springs on its carriage may be varied through the provision of a series of holes 28 in the corresponding of the legs 27, spaced outwardly from the shaft 14.

For limiting the movement of each of the oscillatable carriages 6 under impetus of its return spring 26, there are mounted on opposite sides of the casing 17 a pair of adjustable stops or stop screws 29, each of which is disposed in the path of, and adapted to abut a confronting face of its associated carriage. To limit movement of the carriages in the opposite direction under drive of their ratchets, provision is made for disengagement or release of the connecting pawl 21 at the desired moment. This is obtained through the use of an adjustable release member or release screw 30 positioned to engage the striking arm 24 of the associated pawl and cause the pawl to pivot away from the ratchet, thereby disengaging its tooth 22 from the particular drive tooth 20 of the ratchet. While the several adjustments already described will normally be adequate for proper functioning of the apparatus, a further adjustment may be obtained by adjustably mounting the pen-carrying hangers 7 on their respective carriages, as through the illustrated screw and slot connections 31.

In operation, one of the pens 2 normally occupies a position at the margin of the chart 1, being held there by its return spring 26, the other pen either occupying the opposite margin or a position within the chart, depending upon the function last recorded. While the apparatus is inactive, the pens remain in these positions. However, once any variable function activates the driving motor or other driving means 13, the various components of the recording mechanism come into play. The several functions performed by these components are shown in Figures 4 through 9, in which it has been assumed merely for purposes of illustration, that both pens are initially in their marginal positions, the latter hereinafter being termed their normal positions. These figures are divided into three groups of complementary figures, Figures 4 and 5 one group, Figures 6 and 7 another and Figures 8 and 9 the third, the figures within each group showing the corresponding positions of the upper and lower ratchets and associated mechanisms, and the several groups showing as many different positions of these parts.

As shown in Figure 4 of the first group, a clockwise rotation of the shaft has caused the upper of the carriages 6 to be disturbed from its normal position through engagement of the tooth 22 of its pawl with one of the teeth 20 of the upper ratchet 18, resulting in corresponding clockwise movement or excursion, partly across the chart, of the associated of the pens 2. During this period the other pawl, by reason of the opposite facing of the associated lower ratchet 19, merely slides along the periphery of its ratchet, the second pen 2, during this period, being held in normal marginal position by its return spring 26, as seen from Figure 5. In Figure 6, clockwise rotation of the shaft 14 has progressed such that the pen associated with the upper ratchet 18 has reached the opposite margin of the chart, and the pawl 21, pivoted by its release screw 30, has its tooth 22 at the point of disengagement with the ratchet tooth 20. From Figure 7, it is apparent that this further clockwise excursion of the first pen has not affected the second, the latter continuing to write in the margin. The last of the groups shows the effect of counter-clockwise rotation on the mechanism. In this instance, the first pen, as shown in Figure 8, is inactive, while the second, in Figure 9, driven by the lower ratchet 19, has moved part way across the chart.

Referring back to Figure 6, it will be evident that the first pen will be returned to normal position by its return spring 26, immediately upon disengagement of the pawl and ratchet. If clockwise rotation of the shaft 14 continues, the tooth of the pawl will then engage the next succeeding tooth of the ratchet, again carrying the pen, clockwise, across the chart. On the other hand, if the shaft should reverse its direction of rotation at the point shown in Figure 6, the lower ratchet 19 would be engaged by its associated pawl, causing the second pen to traverse the chart in a counter-clockwise direction. Should a shift in the direction of the driving means occur intermediate a full revolution, the pen then being driven would continue to follow any shifts, the driving and driven faces of its pawl and ratchet being held in engagement by the coil spring 26 until such time as it was carried back to its marginal position, whereupon either it or the other pen would take up the trace, depending on the direction of rotation of the shaft.

It will be evident from the foregoing discussion that one or the other of the recording pens will always respond to the variable functions fed into the apparatus and the chart will thus provide a continuous record of the values of these functions at any given time. Furthermore, it will be readily discernible, without difficult interpretation, whether the trace was the result of clockwise or counter-clockwise movement. Thus, for example, if the apparatus is employed for recording wind direction, with north the normal position, and the wind should shift clockwise from north through east to west and then reverse its direction and turn counter-clockwise 360° back to west, the pen associated with the upper ratchet 18 would provide the trace from the start at 0° to 270° and back through the shift back to 0°, where the second pen would take up the trace, starting at its margin or 360° and stopping at 270°. If, instead of reversing direction on reaching west, the wind had continued to shift clockwise around to east, the pen associated with the upper ratchet would have provided the entire trace. In this instance, the pen, starting again at its margin or 0°, would have traversed the chart to 360°, then jumped back to the 0° margin and from there recommenced its clockwise traverse, stopping at 90°.

The same clarity of recordation would have obtained had the pens been employed for recording linear instead of circular functions. In such case, with the illustrated embodiment, the linear functions, such as variations in liquid level, would first be converted into corresponding circular functions by any accepted means, as rack and pinion or rope and pulley. Thereafter, shifts in either direction of the linear functions would be recorded by one or the other of the two pens in the same manner as in recording circular functions.

The recording apparatus of the present invention is not only capable of making distinct and readily readable records of variable functions, in the manner just described, but by reason of its ratchet drive makes such records with minimum resistance to input torque and negligible creepage of the pens, thus rendering the apparatus both extremely sensitive and very accurate. This efficiency of operation is the result of the use of a ratchet drive coupled with certain of the features of the disclosed apparatus. It has been stated that one of the pens or recording members will take up the trace as the other pen reaches its starting position. In order that there be neither gap nor overlap in the trace, it is essential that these two actions be synchronized such that the release of one pen and engagement of the other will be simultaneous. The achievement of this result requires not only the use of the aforementioned identical oppositely facing ratchets, but that the faces of the two ratchets be so related in position that engagement of its pawl by the driving face of one ratchet and disengagement of its pawl by the engaged driving face of the other, will be concurrent. As the number of teeth is determined by the angle through which each tooth must drive in order to obtain the desired extent of arc described by the point of the associated pen, and the teeth are equally spaced about the ratchets, it is only necessary that the driving faces of the teeth of the upper ratchet directly overlie the driving faces of the teeth of the lower ratchet, to obtain the desired simultaneity of action. This relation of the driving faces of the two ratchets is best illustrated in Figure 4.

Along with simultaneity of engagement and release, accuracy of trace is dependent upon substantially exact duplication in each pen of the movements of its associated ratchet. So long as the driving and driven faces of the ratchet and pawl are in full engagement, it is obvious that the desired duplication will be obtained. However, during the latter part of the traverse, these faces are in process of disengagement through contact of the striking arm 24 of the pawl with its release screw 30. The ideal construction to eliminate all creepage during this disengagement would be to utilize as the engaging surfaces cylindrical surfaces of equal radius having as their common center the pivot 23 of the particular pawl, since with such surfaces there would obviously be no relative movement of the carriage and its associated ratchet, regardless of the extent of the engagement of the driving and driven faces. However, the extreme accuracy required in the machining of such faces would make the cost of the apparatus comparable with that of the expensive cam-driven recording mechanisms which it seeks to replace. Consequently, as an expedient in the manufacture of such faces, the driving and driven faces of the ratchets and pawls are made flat or planar. With flat faces, the extent of creepage is determined by three factors, one the depth, radially, of the driving tooth of the ratchet, the second the length of the arm between the pivot and the driven face of the pawl, and third, the interval of the total traverse over which disengagement of pawl and ratchet occurs. Of the three, the first must be held at a minimum and the second and third at maxima, consistent with practicability. Thus, in the illustrated embodiment, the driving face of each ratchet tooth lies in a radial plane, passing through the axis of rotation of its ratchet, a radius being the shortest distance from the peak of each tooth to its root. So with the second of the factors, the pivot 23 of the pawl is set in a portion of the carriage 6 offset away from the driven face of the pawl to provide a maximum radius arm, minimizing the curvature of the path travelled by the driven face during its engagement. The third, the striking arm 24 of the pawl, is of sufficient length and so disposed relative to the release screw 30 that its engagement occurs over substantially half of the total traverse. Consequently, while some creepage will be obtained, this creepage is so small and spread over such a large portion of the arc described by the point of the pen that its effect on the accuracy of the record is negligible.

The remaining of the features previously mentioned is the extreme sensitivity of the apparatus due to the negligible counter-torque resisting the input torque. This resistance is first minimized by amplification of the input torque through the reduction gearing by which the control shaft 14 is driven. So amplified, the torque is resisted by the force of the return spring and the frictional resistances between the release screw and arm of the pawl and between the driving and driven faces of the ratchet and pawl. Since the return spring need only overcome pen friction, it may be relatively weak with consequent lack of effect upon input torque. So with the frictional forces, components mainly of the reaction spring 25, the latter may also be relatively weak since, in maintaining contact between the vertically pivoted pawl and ratchet, it acts only in a substantially horizontal plane. This frictional resistance is further minimized by so disposing the release screw and striking arms of the associated pawls that they are substantially at right angles during the interval of contact. With counter-torque so minimized, it is possible to drive the apparatus by means developing much less input torque and thus much more sensitive than any means heretofore employable for this purpose.

From the above detailed description it will be apparent that there has been provided an improved recording apparatus capable of recording variable functions, whether circular or linear, which is ratchet driven and combines relative inexpensiveness with extreme accuracy and sensitivity. It should be understood that the described and disclosed embodiment is merely exemplary of the invention and that all modifications are intended to be included which do not depart either from the spirit of the invention or the scope of the appended claims.

Having described my invention, I claim:

1. Recording apparatus comprising a plurality of oppositely facing ratchets fixed to a shaft in superposed relation, means for transmitting variable functions to said shaft, and a recording member driven by each of said ratchets for recording said functions.

2. Recording apparatus comprising a pair of oppositely facing ratchets keyed to a shaft in superposed relation, means for transmitting variable functions to said shaft, a recording member associated with each of said ratchets, and a pawl connecting each of said members to its associated ratchet for driving said member.

3. Recording apparatus comprising a pair of ratchets keyed to a shaft in superposed relation, means for transmitting variable functions to said shaft, a recording member associated with each of said ratchets and pivotally mounted on said shaft, and a pawl connecting each of said members to its associated ratchet for driving said member.

4. Recording apparatus comprising a plurality of ratchets fixed to and spaced axially of a shaft, means for transmitting variable functions to said shaft, recording means associated with each of said ratchets and pivotally mounted on said shaft, and a pawl carried by each of said recording means and connecting said recording means to its associated ratchet for driving said recording means.

5. Recording apparatus comprising a plurality of ratchets fixed to and spaced axially of a shaft, means for transmitting variable functions to said shaft, recording means associated with each of said ratchets and pivotally mounted on said shaft, a pawl connecting each of said recording means to its associated ratchet for driving said recording means in one direction, yieldable means for urging said recording means in the opposite direction, and means for limiting movement of said recording means in either direction.

6. Recording apparatus comprising a drive shaft, reduction gearing for transmitting to said drive shaft variable functions fed into said apparatus, a plurality of identical oppositely facing ratchets fixed to said shaft in spaced relation, each of said ratchets having equally spaced teeth corresponding in number to the ratio of said reduction gearing, a carriage associated with each of said ratchets and pivotally mounted on said shaft, a pawl pivotally mounted on each of said carriages and engageable with the teeth of the associated ratchet, a stop member engageable with each of said pawls on movement of the associated carriage in one direction under drive of the associated ratchet for releasing said pawl from the confronting tooth of said ratchet, and means for moving said carriage in the opposite direction on release of said pawl.

7. Recording apparatus comprising a drive shaft, a pair of identical oppositely facing ratchets spacedly fixed to said shaft, each of said ratchets having a plurality of equally spaced teeth, recording means associated with each of said ratchets, a pawl connecting each of said recording means to the associated ratchet for drive thereby, and means for limiting the movement of said recording means, said limiting means being positioned to drivably connect one of said recording means to its associated ratchet at the limit of driven movement of said other recording means.

8. Recording apparatus comprising a plurality of spaced oppositely facing fixedly connected rotatable ratchets, recording means associated with each of said ratchets, means for drivably connecting each of said recording means to the associated ratchet for driving said recording means on rotation of said ratchet in one direction, and means for substantially simultaneously disconnecting one of said recording means from and connecting said other recording means to their associated ratchets.

9. Recording apparatus comprising a pair of spaced oppositely facing fixedly connected rotatable ratchets, a pair of recording members drivable in opposite directions and each drivably connectable to one of said ratchets, and means for limiting movement of said recording members, said means being constructed and arranged to cause selective driving engagement of said recording members with their associated ratchets.

10. Recording apparatus comprising a pair of spaced oppositely facing fixedly connected rotatable ratchets, a pair of recording members drivable in opposite directions and each drivably connectable to one of said ratchets, means associated with said recording members for yieldably opposing drive thereof by said ratchets, and means for limiting movement of said recording members, said means being constructed and arranged to cause selective driving engagement of said recording members with their associated ratchets.

11. Recording apparatus comprising a ratchet movable in a plurality of directions in response to variable functions, a pawl engageable with and drivable by said ratchet on movement thereof in one of said directions, means yieldably opposing drive of said pawl in said one direction for holding said ratchet and pawl in driving engagement on movement of said ratchet in another of said directions, recording means drivably connectable to said ratchet through said pawl, and means for limiting movement of said recording means under drive of said ratchet in either of said directions.

12. Recording apparatus comprising a ratchet rotatable in either direction in response to variable functions transmitted thereto, an oscillatable recording member, means for limiting oscillating movement of said recording member, and means including a pawl and means yieldably resisting movement of said recording member in one direction for drivably connecting said recording member to said ratchet through said pawl for drive in either direction thereby, said connecting means enabling said recording member to record a cycle of one of said functions between the limits of movement of said member.

13. Recording apparatus comprising a ratchet fixed to and rotatable in either direction through a drive shaft in response to variable functions, a recording member rotatably mounted on said shaft, a pawl carried by said recording member and engageable with said ratchet for moving said recording member with said ratchet on movement thereof in one of said directions, means yieldably opposing movement of said recording member in said one direction for holding said ratchet and pawl in driving engagement and therethrough moving said recording member with said ratchet on movement of said ratchet in the other of said directions, and stop means engageable with said pawl for releasing said pawl from said ratchet and limiting movement of said recording member in either direction under drive of said ratchet.

14. Recording apparatus comprising a pair of identical oppositely facing ratchets fixedly mounted on a drive shaft, each of said ratchets having a plurality of equally spaced teeth having substantially flat driving faces, each of said faces of the teeth of one of said ratchets being substantially coplanar with a face of a tooth of said other ratchet, a recording member associated with each of said ratchets and pivotally mounted on said shaft, a pawl pivotally mounted on each of said recording members for drivably connecting said recording member to a tooth of its associated ratchet, a stop member engageable with each of said pawls for releasing said pawl from the associated ratchet and limiting movement of said recording member under drive of said ratchet, yieldable means for returning each of said recording members to normal position on release of the associated ratchet, and a second stop member for limiting movement of each of said recording members under impetus of said yieldable means, said stop members being disposed to prevent movement of one of said recording members during movement of said other recording member.

15. Recording apparatus comprising a pair of oppositely facing ratchets fixed to a shaft rotatable in either direction in response to variable functions, a pair of pawls connected to and oscillatable about said shaft and each engageable with one of said ratchets for drive of each of said pawls in one direction by the associated one of said ratchets, means yieldably opposing drive of each of said pawls in said one direction for holding said pawl in driving engagement with the associated one of said ratchets on movement of said associated ratchet in the opposite direction, a recording member connected to and oscillatable with each of said pawls and drivable therethrough by the associated of said ratchets, and means for adjustably limiting the extent of oscillation of said pawls.

References Cited in the file of this patent

UNITED STATES PATENTS

| | | |
|---|---|---|
| 483,102 | Crook | Sept. 20, 1892 |
| 1,356,116 | Aberegg et al. | Oct. 19, 1920 |
| 1,466,050 | Koski | Aug. 28, 1923 |
| 1,547,528 | Sears | July 28, 1925 |
| 1,620,224 | Palmer | Mar. 8, 1927 |
| 1,827,178 | Tonietti | Oct. 13, 1931 |
| 1,958,909 | Chappell et al. | May 15, 1934 |
| 2,085,224 | Krueger | June 29, 1937 |

FOREIGN PATENTS

| | | |
|---|---|---|
| 335,347 | Great Britain | May 17, 1930 |
| 969 | Great Britain | 1911 |